United States Patent [19]

Cook et al.

[11] Patent Number: 4,901,758

[45] Date of Patent: Feb. 20, 1990

[54] DEVICE FOR THE REMOTE CONTROL OF PNEUMATICALLY OPERATED MECHANISMS, WHICH HAS FAST, HIGH RESOLUTION RESPONSE OVER A BROAD RANGE OF PRESSURES AND WHICH IS INSENSITIVE TO POSITION OR VIBRATION

[76] Inventors: Daniel E. Cook, 300 N. Leland, Fortville, Ind. 46040; Edward D. Lewis, 6042 Schoolwood Dr., Speedway, Ind. 46224

[21] Appl. No.: 879,455

[22] Filed: Jun. 27, 1986

[51] Int. Cl.⁴ .............................................. G05D 9/12
[52] U.S. Cl. ............................... 137/487.5; 137/489.5; 251/30.05
[58] Field of Search .................. 137/487.5, 489.5, 492, 137/492.5; 251/30.05

[56] References Cited

U.S. PATENT DOCUMENTS

| | | | |
|---|---|---|---|
| 2,477,897 | 8/1949 | Ray ..................................... | 251/25 X |
| 2,736,337 | 2/1956 | Parks et al. ....................... | 137/492.5 |
| 3,077,552 | 2/1963 | Koppel ............................... | 137/487.5 X |
| 3,369,561 | 2/1968 | Zimmerman et al. ........ | 137/487.5 X |
| 3,957,244 | 5/1976 | Chouvigne ....................... | 251/30.05 |
| 4,244,396 | 1/1981 | Friedland et al. .............. | 137/487.5 |
| 4,253,480 | 3/1981 | Kessel et al. . | |
| 4,355,657 | 10/1982 | Reip ................................... | 137/492 |
| 4,481,967 | 11/1984 | Frick . | |
| 4,527,583 | 7/1985 | Simpson . | |

FOREIGN PATENT DOCUMENTS 234718  7/1961  Australia ............................. 251/25

Primary Examiner—Stephen M. Hepperle
Attorney, Agent, or Firm—Woodard, Emhardt, Naughton Moriarty & McNett

[57] ABSTRACT

An electropneumatic transducer which operates quickly and accurately over a broad range of pressures to control high pressure, high flow devices at their point of operation. The transducer is lightweight and insensitive to position or vibration, and can be readily mounted to the device to be controlled at its workpoint and operated remotely by a process controller or other electrical device. There is also provided both internal and external feedback whereby the repeated accurate operation of the transducer is assured.

7 Claims, 4 Drawing Sheets

DEVICE FOR THE REMOTE CONTROL OF PNEUMATICALLY OPERATED MECHANISMS, WHICH HAS FAST, HIGH RESOLUTION RESPONSE OVER A BROAD RANGE OF PRESSURES AND WHICH IS INSENSITIVE TO POSITION OR VIBRATION

BACKGROUND OF THE INVENTION

1. Field of the Invention:

The field of the invention is devices for the electropneumatic control of pneumatically operated mechanisms. More particularly, the field of the invention is such devices which operate to control high pressure industrial process pneumatic mechanisms over a broad range of pressure inputs (typically 0 to 100 psi).

2. Description of the Prior Art:

There are a wide variety of pneumatically operated devices in use today. These devices can generally be divided into two broad categories: low pressure devices and high pressure devices. Many Heating, Ventilating, and Air Conditioning systems (HVAC) include typical low pressure devices. Such devices operate on a range of 3-15 psi, and do not require fast response time or great accuracy. Many high pressure devices operate on a range of 0 to 100 psi and generally require high pressure inputs to move the larger mechanical mechanisms which they involve. Such devices include a wide range of industrial process applications. Although many such devices have not operated on high resolution input, there are significant attendant advantages to be gained by such operation. One area in which a fast actuating, high resolution input would be most useful is Robotics. Just one example where Robotics can effectively utilize a fast actuating, high resolution input is linear positioning.

There are three basic types of electropneumatic transducers in use to control industrial process pneumatic mechanisms: voice-coil beam; voice-coil beam damped by an oil dashpot; and torque motor mechanisms. Voice-coil beam transducers, which basically utilize a nozzle and flapper to generate a proportionate pneumatic signal in response to an electrical current which varies the position of the flapper with respect to the nozzle. Voice-coil beam transducers tend to be vibration sensitive and are thus not suitable for workpoint application. In a damped transducer, an oil dashpot reduces the sensitivity to vibration, however the response time is much slower and damped transducers are position sensitive since the oil can leak out. Torque-motor transducers utilize a torque motor to control the position of the flapper. These devices are relatively insensitive to vibration and mounting angle, however, they weigh up to 3 to 4 times as much as voice-coil units and cost 3 to 5 times as much. Because of their weight and cost, torque-motor transducers are often not suitable for workpoint pneumatic control either.

There is a need for a device which can quickly and accurately control pneumatically operated industrial process mechanisms over a broad range of pressures and which is insensitive to position or vibration.

SUMMARY OF THE INVENTION

Generally speaking, the present invention provides a new and unique electropneumatic transducer which is highly suitable for workpoint industrial application. A transducer of the present invention can operate quickly and accurately over a broad range of pressures to control high pressure, high flow devices at their point of operation. The transducer, which involves simple circuitry, is lightweight and insensitive to position or vibration. The transducer can be readily mounted to the device to be controlled at its workpoint and operated remotely by a process controller or other electrical device. There is also provided both internal and external feedback whereby the repeated accurate operation of the transducer is assured.

DESCRIPTION OF THE PREFERRED EMBODIMENT

Figure 1:
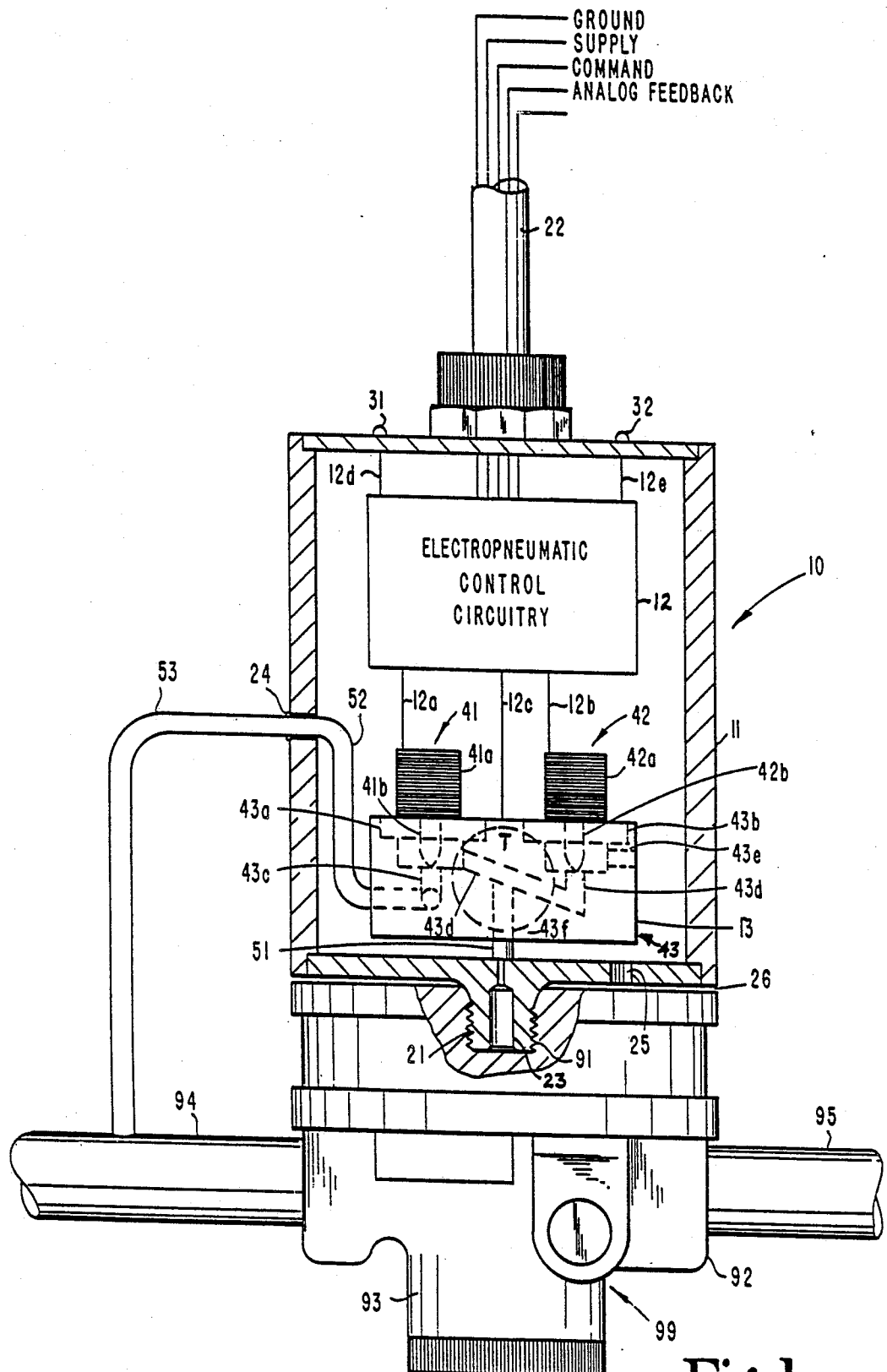
FIG. 1 is a partial fragmentary, side elevational view of an electropneumatic controller according to the present invention operationally attached to a pilot operated regulator. Electronic circuitry in FIG. 1 has been shown in block form.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings, FIG. 1 illustrates an electropneumatic controller 10 which is operationally attached to pilot operated regulator 99. Pilot operated regulator 99 operates in response to a low volume pneumatic pressure at input 91 to regulate a corresponding high volume pressure outputs 95 from main line supply pressure supply input 94. Thus pilot operated regulator 99 acts as a volume booster, whereby small volume pressure inputs are translated to high volume pressure outputs. Typically the range of pressure is 0 to 100 psi.

Electropneumatic controller 10 includes encasement 11, control circuitry 12 and valving apparatus 13. Encasement 11 is constructed of durable waterproof material that is environmentally safe for exposure to severe industrial working conditions. In one embodiment, encasement 11 is constructed of aluminum material. At one end, encasement 11 is configured with a protruding male thread 21 which is designed to cooperatively receive a standard female thread used by most pilot operated regulator manufacturers. At the opposite end cable 22 extends from encasement 11. Cable 22 carries electrical lines for GROUND, SUPPLY, COMMAND, AN- ALOG FEEDBACK and TTL. These lines are carried by cable 22 back to electronic control circuitry (not shown).

Figure 3:
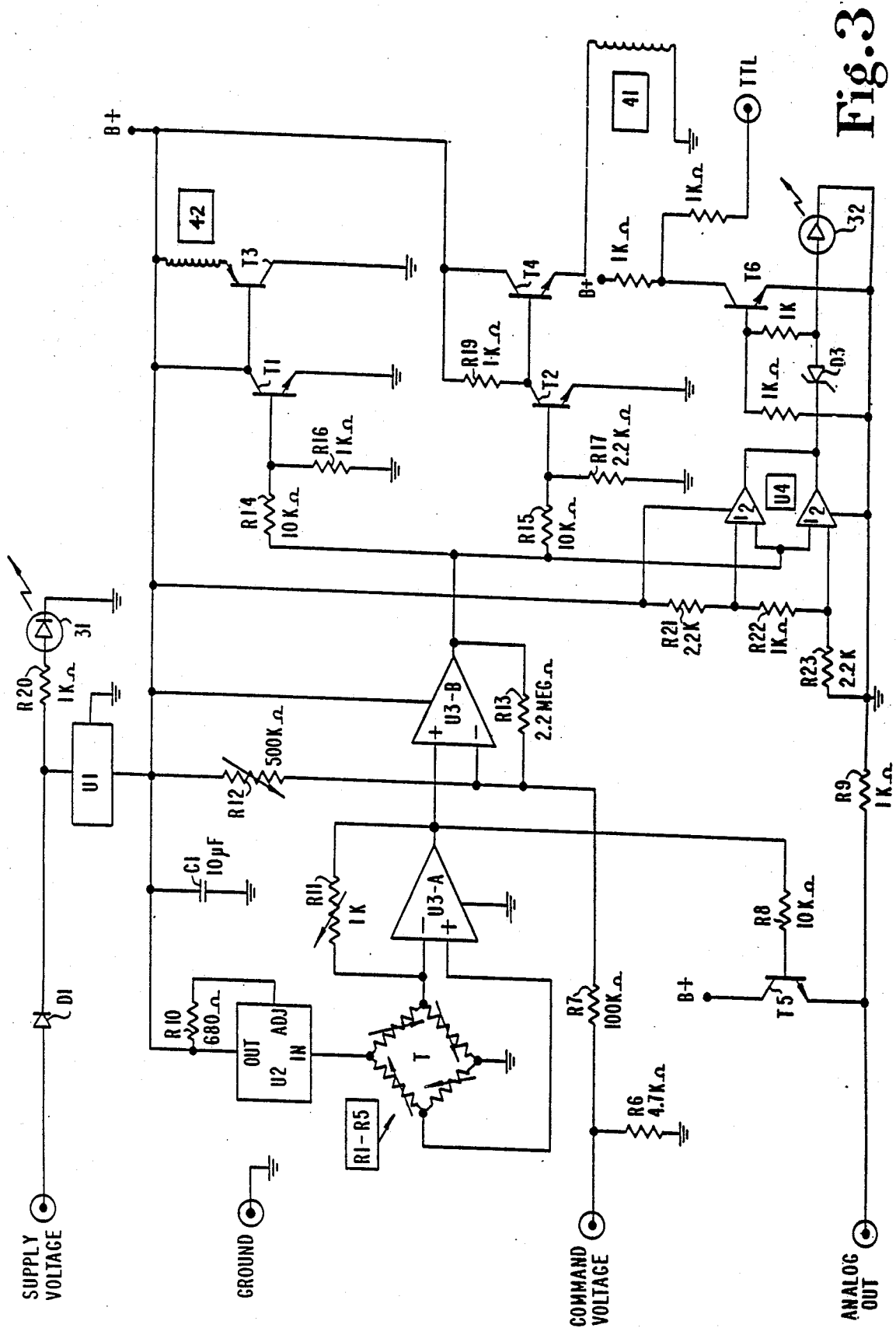
FIG. 3 is a schematic diagram of the control circuitry shown in block form in FIG. 1.

Electropneumatic control circuitry 12, which is shown in block form in FIG. 1, is more specifically shown in FIG. 3. The details and operation of electropneumatic control circuitry 12 will be more particularly described below in reference to FIG. 3. Generally though, electropneumatic control circuitry 12 is connected to electronic control circuitry (not shown) by GROUND, SUPPLY, COMMAND, ANALOG FEEDBACK and TTL wires through cable 22. Electropneumatic control circuitry 12 operates to selectively control the opening and closing of valves 41 and 42 through lines 12a and 12b respectively. Electronic control circuitry 12 receives feedback from transducer T through line 12c. Power indicator lamp 31 is operated by electropneumatic control circuitry 12 through line 12d, and TTL indicator lamp 32 is operated by electropneumatic control circuitry 12 through line 12e.

Valve apparatus 13 includes valves 41 and 42, valving manifold 43, and pneumatic transducer T. Valves 41 and 42 are of the poppit variety and include spools 41a and 42a, and poppit pins 41b and 42b respectively. Pins 41b and 42b are positioned within valving chambers 43a and 43b of manifold 43. In closed positions, pins 41b and 42b seat against the seating orifices of passageways 43c and 43d respectively. Chamber 43a additionally has a vent orifice which opens to passageway 43d, whereby the venting orifice of chamber 43a and the seating orifice of chamber 43b are in fluid communication through passageway 43d. Passageway 43d is also in fluid communication with pneumatic transducer T as well as passageway 43f. Passageway 43f connects with tubing 51 which leads to output orifice 23 of encasement 11. Valve chamber 43b additionally defines a venting orifice whereby air is vented through passageway 43e to the interior of encasement 11. Passageway 43c connects to tubing 52 which connects to supply orifices 24 of encasement 11.

In operation, tubing 53 connects supply line 94 to supply orifice 24 whereby controller 10 receives its supply pressure. As mentioned, passage 43e generally vents to the interior of encasement 11. To avoid the buildup of pressure within encasement 11, venting orifice 25 allows excess pressure to be vented to the external atmosphere. This excess pressure passes through orifice 25 and is dissipated through spacing 26 between encasement 11 and pilot operated regulator 99. Spacing 26 is provided for by the configuration of protruding male thread 21 which allows for a tight fit between pilot operated regulator 99 and encasement 11 but which does not allow pilot operated regulator 99 and encasement 11 to become flush. In this way, orifice 25 is protected from external conditions in the industrial environment in which controller 10 is operating that might otherwise result in the plugging of orifice 25 and which could conceivably cause damage or inaccurate operation of controller 10.

Figure 2A:
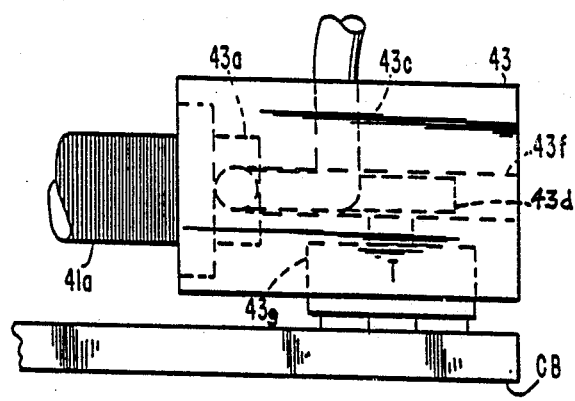
FIG. 2A is a side elevational view of the valve/manifold/transducer/circuit board arrangement of the electropneumatic controller of FIG. 1, with certain interior features shown by dashed lines.
Figure 2B:
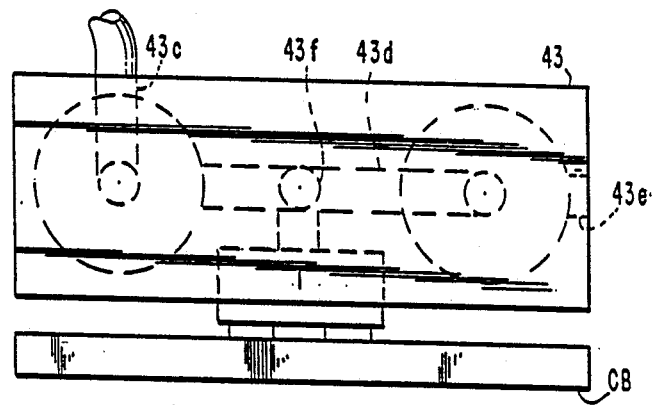
FIG. 2B is a front elevational view of the portion of the controller shown by FIG. 2A.
Figure 2C:
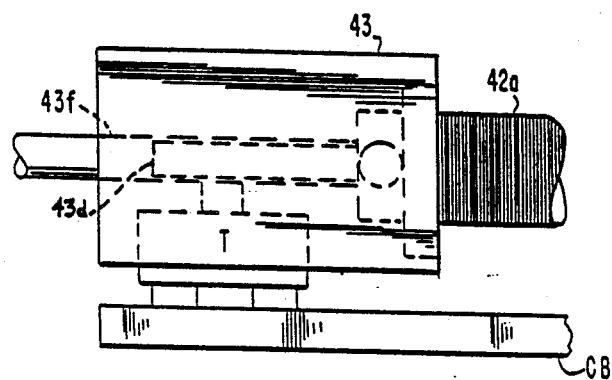
FIG. 2C is a side elevational view of the portion of the controller shown by FIG. 2A from the opposite view.

FIGS. 2A, 2B and 2C show various views of the valves/manifold/transducer/circuit board arrangement of valving apparatus 13 of FIG. 1. Transducer T is positioned within transducer chamber 43g of manifold 43, as connected to circuit board CB by its connector pins. The pneumatic input of transducer T is directly connected to passageways 43d and 43f.

The control circuitry for the electropneumatic pressure controller will now be described with reference to FIG. 3. The electropneumatic control circuitry 12 includes a closed-loop control system for controlling the output air pressure of the electronic regulator through actuation of two valves 41 and 42 in response to a command voltage and the output pressure sensed by a pressure transducer T1. As shown in FIG. 3, the electronic circuitry includes five electrical connections: SUPPLY VOLTAGE, GROUND, COMMAND VOLTAGE, AN ANALOG OUTPUT AND TTL. A conventional voltage regulator U1 provides a regulated power supply of voltage B+ for all active components in the electronic circuitry. Diode D1 is provided for protection against inadvertent connection of the electronic circuitry to a power supply of the incorrect polarity, and light-emitting diode 31 and resistor R20 cooperate to provide a visual output indicative of a proper electrical connection to voltage regulator U1. The B+ power supply includes a filter capacitor C1 on the output of voltage regulator U1. The quiescent state for all four legs of the bridge of transducer T is set by current regulator U2 at a value determined by resistor R10. The output of the bridge of transducer T is connected to a differential amplifier U3-A which has a potentiometer R11 connected from its output to its inverting input for gain control. The output of U3-A is connected to the noninverting input of error amplifier U3-B the inverting input of which is connected to the command voltage input through resistor R7. Resistor R6 provides a DC path to ground from the command voltage input. The inverting input of U3-B is also connected to its output through resistor R13, which controls the gain of U3-B, and to B+ through potentiometer R12 which can be used for offset control. Error amplifier U3 provides at its output a voltage proportional to the difference between the command voltage input and the amplified bridge output voltage, and the resulting error signal is supplied to dual driver stages consisting of transistors T1 to T4 and their associated circuitry as shown in FIG. 3.

More specifically, the driver stage for a valve 42 consists of transistors T1 and T3, transistor T1 operating in common-emitter configuration with input resistor R14 and bias resistor R16, and with its collector connected to the B+ power supply. The collector of transistor T1 is also connected to transistor T3, which operates in common-base mode, the emitter of transistor T3 being connected to the coil of valve 42. The driver stage for valve 41 consists of transistors T2 and T4, T2 being similarly connected in common-emitter configuration with input resistor R15 and bias resistor R17 and with a collector resistor R19 connected to the B+ power supply. T4 operates as a voltage follower and supplies the output current to the coil of valve 41.

As will now be described, the closed-loop control system actuates valves 41 and 42 to provide a regulated output air pressure which is set by the command voltage. Each time the command voltage is set to a new level for selection of a new regulated output air pressure, a voltage difference instantaneously appears at the input of error amplifier U3 as a result of which an error signal is provided to both driver stages. An increase in the command voltage responds to a desired increase in output pressure and causes an instantaneous decrease in the error signal produced by error amplifier U3-B. This decrease in the error signal results in an increase of the current supplied to inlet valve 41 because the transistor circuit comprising T2 and T4 is an inverting transistor amplifier. Conversely, the transistor driver stage consisting of transistors T1 and T3 is a noninverting transistor amplifier. Consequently, the error signal decrease results in a decrease in the current supplied to exhaust valve 42. This set of conditions causes an increase in the pressure, which is sensed by transducer T1 and converted to a feedback signal supplied to the noninverting input of error amplifier U3-B. That feedback signal rises in amplitude until the feedback control system reaches a steady state, after which minor perterbations caused by vibration or other environmental characteristics are automatically compensated for by action of the closed-loop control system. The feedback signal from pressure transducer T1 and its associated differential amplifier U3-A is also provided as an external analog output signal through transistor T5 connected in an emitter-follower configuration and connected to the output of U3-B through a resistor R8. T5 is provided with a bias resistor R9 to ground.

The control circuitry also includes a window detector for providing a digital output when the error signal amplitude is outside of a prescribed range. The window detector is built around the two halves of operational amplifier U4 connected in a conventional fashion as shown in FIG. 3, with upper and lower window threshold levels set by resistors R21, R22 and R23 connected between B+ and ground and having outputs connected to U4 as shown in the drawing. In one state, the window detector supplies a high (logical one) to a transistor level shifter and to LED 32 for visual indicator of the in-range or out-of-range condition of the window detector. Transistor T6 and its associated input resistors and collector resistor convert the window detector output level to a different level as well as invert that signal, and the output signal is then supplied to the TTL output of the control circuitry.

The operation of controller 10 in relation to the control of pilot operated regulator 99 will now be described. Electropneumatic control circuitry receives a command voltage through COMMAND LINE from between 0 to 10 volts, corresponding to a proportionate commanded pressure of 0 to 100 PSI. Electropneumatic control circuitry 12 also receives pneumatic feedback from pneumatic transducer T through line 12c. In the static state, this feedback represents the pneumatic pressure within passageways 43d 43f and lines 51 to output orifice 23. During the dynamic changing of pressures, however, there will be some transient variances within these passageways due to line air capacitance. The effect of these variances will be described at a later point in this application.

In response to the comparison between the commanded pressure from COMMAND LINE and actual pressure from line 12c, electropneumatic control circuitry 12 will command the opening of poppit valve 41 or poppit valve 42. If the commanded pressure is greater than the actual pressure then poppit valve 41 will be commanded to be opened whereby supplied pressure will be added through lines 53, 52, passageway 43c, chamber 43a, passageways 43d and 43f, and line 51 to output orifice 23. Since the seating of poppit pin 41b is against the high side pressure at passageway 43c, the actuation of valve 41 will occur more quickly as the high pressure side acts to force poppit pin 41b away from its seating orifice. When the actual pressure reading of transducer T shows an actual pressure which is equal to the commanded pressure by COMMAND LINE, then electropneumatic control circuitry 12 will act to command the closing of poppit valve 41. Due to the dynamic variations of pressure within passageways 43d 43f and line 51 because of line air capacitance, as above mentioned, and because of actual variations in the operation of valve 41, there will be a tendency to either overshoot or undershoot the commanded pressure.

While the operation, as above described, could operate within certain ranges of accuracy, more precise accuracy can be achieved by the following additional step. At this point, any such minor variation between a commanded pressure and the actual pressure is sensed by electropneumatic control circuitry 12. Say, for example, that the commanded pressure has been overshot and that the actual pressure is now 0.5 psi greater than the commanded pressure. To achieve a high degree of accuracy, electropneumatic control circuitry 12 should next command the opening poppit valve 42 through line 12b, whereby the excess pressure can be released through passageway 43e to reach the precise pressure desired. Were valve 42 to be fully opened, though, then a hysteresis effect would be generated whereby valves 41 and 42 would alternately open and close and whereby the actual pressure at output orifice 23 would constantly vary about the commanded pressure. On the other hand, were valve 42 to remain closed, then there would be a wide dead band about the commanded pressure which would also result in a lessened degree of accuracy. To solve this problem, the intermediate voltage transmitted through line 12b which operates to put valve 42 into a seeping condition whereby the highly accurate control of the pressure at the output orifice 23 can be achieved.

By sending this intermediate voltage signal, poppit pin 42b is not opened, but it is no longer firmly seated against the seating orifice of passageway 43d. The higher pressure in passageway 43d thus presses against poppit pin 42b to slightly push poppit pin 42b away from its seated position, whereby a slight seeping of the excess pressure occurs which thus allows the actual pressure at orifice 23 to be precisely adjusted to reach the commanded pressure inputed at COMMAND LINE.

Thus it is seen that pressure supply valve 41 and pressure vent valve 42 are characterized by three static states: an open state in which these valves are fully open, a closed state in which these valves are fully closed, and a seeping in which the valves seep. The interrelationship between opened, closed and seeping states, as above described, allows for a precise and accurate control of the pressure at output orifice 23. The actual pressure variance at which valves 41 and 42 will seep and at which they will open fully will depend upon the specific valving arrangement—the size and particular characteristic of the valves, the size and length of the passageway and the accuracy and speed of transducer T. With the particular arrangement as described herein, however, it has been found that causing a seeping state where the variance between the actual and commanded pressures is less than about 0.5 psi and fully opening where the variance is greater than 0.5 psi work wells to effectively and repetitively generate precise pneumatic pressures in reponse to command voltage inputs.

Figure 4:
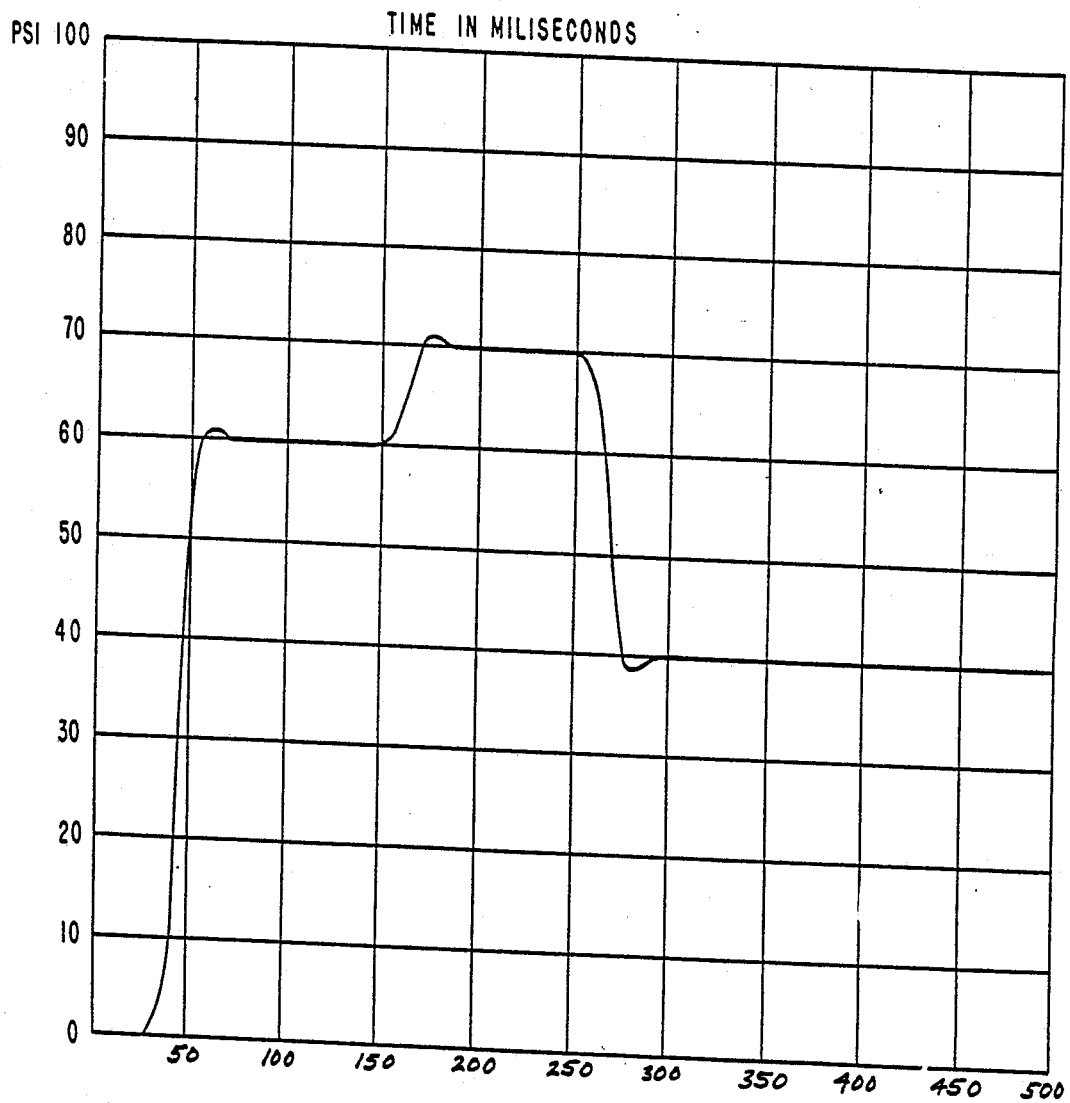
FIG. 4 is a chart of pressure over time showing an example of the operational pressure output of an electropneumatic controller according to the present invention.

FIG. 4 is a chart which illustrates an example of the actual operation of controller 10 to control pilot operated regulator 99. Initially, both the actual and command pressures are at 0 psi. Upon the entry of a command voltage of 6 volts, valve 41 is opened and actual pressure is increased to approximately 60 psi at which time electropneumatic control circuitry 12 commands the closing of valve 41. After homeostasis has been reached, the slight variance between actual pressure and command pressure is then detected by electropneumatic control circuitry 12 which commands valve 42 to seep until the precise commanded pressure of 60 psi is reached.

Next, a command voltage of 7 volts is entered which causes valve 41 to open again, thus increasing actual pressure to approximately 70 psi at which time electropneumatic control circuitry 12 commands the closing of valve 41. After homeostasis, the slight variance between actual pressure and command pressure is again detected and electropneumatic control circuitry 12 commands valve 42 to seep again until the precise commanded pressure to 70 psi is reached.

Lastly, a lower voltage of 4 volts is applied to the COMMAND line. In response to this command, electropneumatic control circuitry 12 causes valve 42 to open, which has the effect of decreasing the actual pressure at output orifice 23 to approximately 40 psi at which time electropneumatic control circuitry 12 commands the closing of valve 42. The slight variance between actual pressure and command pressure is then detected by electropneumatic control circuitry 12 which then commands valve 42 to seep until the precise commanded pressure of 40 psi is reached.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for the remote control of a pneumatically operated mechanism, the mechanism having a pneumatic input port, said mechanism operating in response to the pressure applied to its pneumatic input port; said device comprising:

(a) input/output means for defining an output control pressure port, an input supply pressure port, an output vent port, and an electrical connection port, said output control pressure port being configured to interlock in fluid communication with the pneumatic input port of said mechanism, said electrical connection port including a supply voltage connection and a signal voltage connection;

(b) a transducer, said transducer having a pneumatic input pressure sensor in fluid communication with said output control pressure port, said transducer including means for receiving a supply voltage from said supply voltage connection, said transducer further including means for generating an electrical signal output in proportion to the pressure sensed by said sensor;

(c) a pressure supply valve, said pressure supply valve having a first port in fluid communication with said input supply pressure port and a second port in fluid communication with said output control pressure port;

(d) a pressure vent valve, said pressure vent valve having a first port in fluid communication with output control pressure port and a second port in fluid communication with said output vent port;

(e) said pressure supply valve and said pressure vent valve being characterized by three static states; an open state in which said valves are fully open, a closed state in which said valves are fully closed, and a seeping state in which said valves seep;

(f) control circuitry, said control circuitry including means for receiving a supply voltage from said supply voltage connection, means for receiving a signal voltage from said signal voltage connection and means for receiving the electrical signal output from said transducer, said control circuitry further including means for comparing said signal voltage from said signal voltage connection with said electrical signal output from said transducer and means for generating a control output signal corresponding to the compared difference;

(g) said pressure supply valve being responsive to said control output signal by opening when said control output signal indicates said signal voltage to be greater than said electrical signal output by more than a specified difference, and by closing when said control output signal indicates said signal voltage to be less than said electrical signal output by more than said specified difference;

(h) said pressure vent valve being responsive to said control output signal by closing when said control output signal indicates said signal voltage to be greater than said electrical signal output by more than specified difference, and by opening when said control output signal indicates said signal voltage to be less than said electrical signal output by more than specified difference;

(i) said pressure supply valve being responsive to said control output signal by seeping when said control output signal indicates said voltage to be greater than said electrical signal output by less than said specified difference, and by closing when said control output signal indicates said signal voltage to be less than said electrical signal output by less than said specified difference; and (j) said pressure vent valve being responsive to said control signal by closing when said control output signal indicates said signal voltage to be greater than said electrical signal output by less than a specified difference, and by seeping when said control output signal indicates said signal voltage to be less than said electrical signal output by less than a specified difference.

2. A device for the remote control of a pilot operated regulator, the regulator having a high flow supply pressure port, a high flow output pressure port, and a low flow input port, said regulator operating to generate and regulate a high flow output pressure at said output pressure port in proportion to low flow pressure applied to said low flow input port; said device comprising:

(a) an encasement, said encasement defining an output control pressure port, an input supply pressure port, an output vent port, and an electrical connection port, said output control pressure port being configured to interlock in fluid communication with the low flow input port of said pilot operated regulator, said electrical connection port including a supply voltage connection and a signal voltage connection;

(b) a transducer positioned within said encasement, said transducer having a pneumatic input pressure sensor in fluid communication with said output control pressure port, said transducer including means for receiving a supply voltage from said supply voltage connection, said transducer further including means for generating an electrical signal output in proportion to the pressure sensed by said sensor;

(c) a pressure supply valve, said pressure supply valve having a first port in fluid communication with said input supply pressure port and a second port in fluid communication with said output control pressure port;

(d) a pressure vent valve, said pressure vent valve having a first port in fluid communication with output control pressure port and a second port in fluid communication with said output vent port;

(e) said pressure supply valve and said pressure vent valve being characterized by three static states; an open state in which said valves are fully open, a closed state in which said valves are fully closed, and a seeping state in which said valves seep;

(f) control circuitry, said control circuitry including means for receiving a supply voltage from said supply voltage connection, means for receiving a signal voltage from said signal voltage connection and means for receiving the electrical signal output from said transducer, said control circuitry further including means for comparing said signal voltage from said signal voltage connection with said electrical signal output from said transducer and means for generating a control output signal corresponding to the compared difference;

(g) said pressure supply valve being responsive to said control output signal by opening when said control output signal indicates said signal voltage to be greater than said electrical signal output by more than a specified difference, and by closing when said control output signal indicates said signal voltage to be less than said electrical signal output by more than said specified difference;

(h) said pressure vent valve being responsive to said control output signal by closing when said control output signal indicates said signal voltage to be greater than said electrical signal output by more than a specified difference, and by opening when said control output signal indicates said signal voltage to be less than said electrical signal output by more than a specified difference;

(i) said pressure supply valve being responsive to said control output signal by seeping when said control output signal indicates said signal voltage to be greater than said electrical signal output by less than said specified difference, and by closing when said control output signal indicates said signal voltage to be less than said electrical signal output by less than said specified difference; and (j) said pressure vent valve being responsive to said control output signal by closing when said control output signal indicates said signal voltage to be greater than said electrical signal output by less than specified difference, and by seeping when said control output signal indicates said signal voltage to be less than said electrical signal output by less than a specified difference.

3. A device for the remote control of a pilot operated regulator, the regulator having a high flow supply pressure port, a high flow output pressure port, and a low flow input port, said regulator operating to generate and regulate a high flow output pressure at said output pressure port in proportion to low flow pressure applied to said low flow input port; said device comprising:

(a) an encasement, said encasement defining an output control pressure port, an input supply pressure port, an output vent port, and an electrical connection port, said output control pressure port being configured to interlock in fluid communication with the low flow input port of said pilot operated regulator, said electrical connection port including a supply voltage connection and a signal voltage connection;

(b) a transducer positioned within said encasement, said transducer having a pneumatic input pressure sensor in fluid communication with said output control pressure port, said transducer including means for receiving a supply voltage from said supply voltage connection, said transducer further including means for generating an electrical signal output in proportion to the pressure sensed by said sensor;

(c) a pressure supply valve, said pressure supply valve having a first port in fluid communication with said input supply pressure port and a second port in fluid communication with said output control pressure port;

(d) a pressure vent valve, said pressure vent valve having a first port in fluid communication with said output control pressure port and a second port in fluid communication with said output vent port;

(e) control circuitry, said control circuitry including means for receiving a supply voltage from said supply voltage connection, means for receiving a signal voltage from said signal voltage connection and means for receiving the electrical signal output from said transducer, said control circuitry further including means for comparing said signal voltage from said signal voltage connection with said electrical signal output from said transducer and means for generating a control output signal corresponding to the compared difference;

(f) said pressure supply valve being responsive to said control output signal by opening when said control output signal indicates said signal voltage to be greater than said electrical signal output and by closing when said control output signal indicates said signal voltage to be less than said electrical signal output; and (g) said pressure vent valve being responsive to said control output signal by closing when said control output signal indicates said signal voltage to be greater than said electrical signal output and by opening when said control output signal indicates said signal voltage to be less than said electrical signal output;

and in which said pressure supply valve and said pressure vent valve are poppet valves, each of said poppet valves having a poppet pin which is normally seated against said respective first ports, said respective first ports being the higher pressure said of said respective poppet valves, whereby the actuation of said valves is quickened at high differentials between said control output signal and said electrical signal output, by allowing pressure from the higher pressure side of said respective poppet valves to force said poppet pins away from said respective first ports, and further whereby the accuracy of said device is enhanced at low differentials between said control output signal and said electrical signal output, by allowing the higher pressure from the higher pressure side to slightly push said respective poppet pins from their respective seated positions to cause a seeping of the excess pressure.

4. The device for the remote control of a pilot operated regulator of claim 2, in which said encasement and the pilot operated regulator define a narrow spacing when said output control pressure port of said encasement is interlocked with the low flow input port of the pilot operated regulator, and in which said output vent port opens into said narrow spacing, whereby said output vent port is protected from external conditions in the industrial environment.

5. The device for the remote control of a pilot operated regulator of claim 3, in which said encasement and the pilot operated regulator define a narrow spacing when said output control pressure port of said encasement is interlocked with the low flow input port of the pilot operated regulator, and in which said output vent port opens into said narrow spacing, whereby said output vent port is protected from external conditions in the industrial environment.

6. The device for the remote control of a pneumatically operated mechanism of claim 1, in which said pressure supply valve and said pressure vent valve are poppit valves, each of said poppit valves having a poppit pin which is normally seated against said respective first ports, said respective first ports being the higher pressure side of said respective poppit valves, whereby the actuation of said valves is quickened at differentials between said control output signal and said electrical signal output which are greater than said specified difference, by allowing pressure from the higher pressure side of said respective poppit valves to force said poppit pins away from said respective first ports, and further whereby the accuracy of said device is enhanced at differentials between said control output signal and said electrical signal output which are less than said specified difference, by allowing the higher pressure from the higher pressure side to slightly push said respective poppit pins away from their respective seated positions to cause a seeping of the excess pressure.

7. The device for the remote control of a pilot operated regulator of claim 2, in which said pressure supply valve and said pressure vent valve are poppit valves, each of said poppit valves having a poppit pin which is normally seated against said respective first ports, said respective first ports being the higher pressure side of said respective poppit valves, whereby the actuation of said valves is quickened at differentials between said control output signal and said electrical signal output which are greater than said specified difference, by allowing pressure from the higher pressure side of said respective poppit valves to force said poppit pins away from said respective first ports, and further whereby the accuracy of said device is enhanced at differentials between said control output signal and said electrical signal output which are less than said specified difference, by allowing the higher pressure from the higher pressure side to slightly push said respective poppit pins away from their respective seated positions to cause a seeping of the excess pressure.

* * * * *